S. P. Kittle,
Spring Bed
No. 2,092, Reissued Oct. 17, 1865.
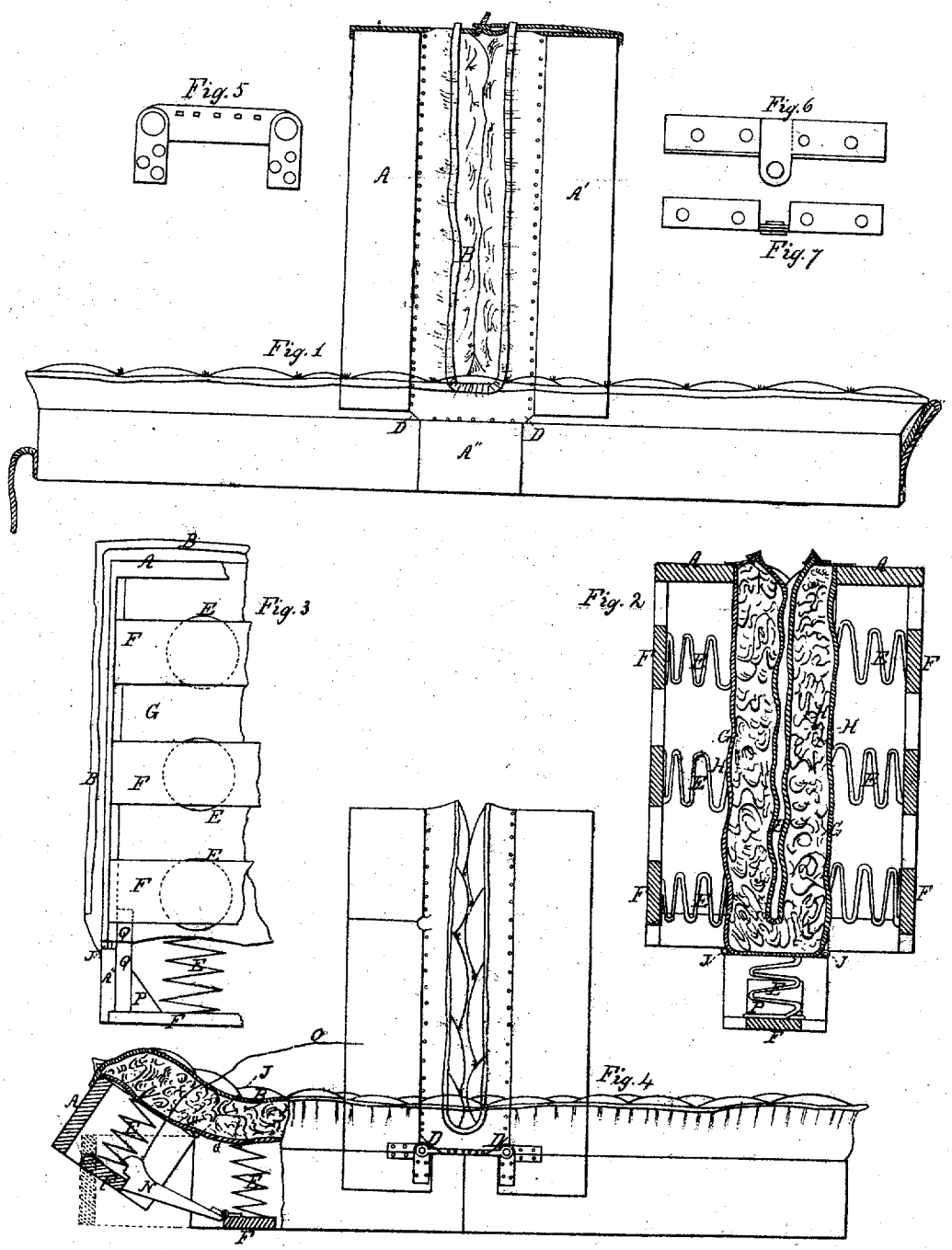
H. James Weston
Isaac T. Kerr
S. P. Kittle
By Thos. P. Cowen
Atty.

UNITED STATES PATENT OFFICE.

SAMUEL P. KITTLE, OF BROOKLYN, NEW YORK.

SPRING-MATTRESS.

Specification forming part of Letters Patent No. 44,960, dated November 8, 1864; Reissue No. 2,092, dated October 17, 1865.

*To all whom it may concern:*

Be it known that I, SAMUEL P. KITTLE, of Brooklyn, in the county of Kings and State of New York, have invented certain new and useful Improvements in Box Spring-Mattresses; and I do hereby declare the following to be a full, clear, and exact description thereof, reference being had to the accompanying drawings, and to the letters of reference marked thereon.

The first part of my invention relates to the division of the sides of the box which contains the springs on which the hair mattress or other stuffing is supported at two points, and connecting the said parts by hinges in such a manner that the joints thereof shall be at two points distant from each other twice the thickness of the stuffing, and so arranged that the head or foot portion of the bed can be folded over so as to bring the principal parts of the box parallel with each other, the stuffing being between them, as hereinafter more fully forth.

The second part of my invention relates to so constructing that portion of the box which forms the short section between the hinges or joints as to make it capable of supporting a portion of the springs, while at the same time it is of such a length as to allow the parts upon each side of it to be hinged to it and connected to each other at two points on each side at the distance apart of twice the thickness of the stuffing, as hereinafter more fully set forth.

The third part of my invention relates to the combination, with the box containing the springs, and hinged at two points on each side at twice the distance apart of the thickness of the stuffing, of a ticking containing the stuffing and gathered at the said hinges or joints to relieve it from strain in folding, as hereinafter more fully set forth.

The fourth part of my invention relates to the combination, with the box which contains the springs that support the stuffing when said box is cut or made in parts so as to be folded up, as hereinafter described, of a double-jointed hinge, the joints being at the distance apart of twice the thickness of the stuffing, and the middle portion of said hinge being perforated with holes to facilitate the proper attachment of the ticking thereto, as hereinafter more fully set forth.

The fifth part of my invention relates to the the combination, with the box containing the springs, and made in parts or cut for folding, of braces adjacent to the folding-point to sustain the sides of the box against the tendency to be forced inward, as hereinafter more fully set forth.

The sixth part of my invention relates to the combination, with the box containing the springs, of a hinge so constructed and so attached to the box that the end portions rest upon and are attached to both the edge and side of the board which forms the side of the box, as hereinafter more fully set forth.

The seventh part of my invention relates to the combination and arrangement of a catch and two of the bars or slats which support the springs for supporting the head portion of the mattress in an elevated position, as hereinafter more fully set forth.

Figure 1 is a side view of the mattress folded, and it also shows in red lines the same extended horizontally. Fig. 2 is a vertical longitudinal section of the same when folded. Fig. 3 is a partial bottom view of the mattress when one part is folded over and laid down upon the other. Fig. 4 is a side view of a modification of the mattress, showing the use of the hinge with the perforated central bar, and also showing the device for supporting the head portion of the mattress in an elevated position, a portion of the side of the box being removed for that purpose. It also shows in red lines the position of the parts when folded. Fig. 5 shows one form of double-jointed hinge with peforated bar in the middle for attaching the ticking. Fig. 6 is a side view of a hinge so constructed as to be attached to and rest upon both the edge and side of the board which forms the side of the box. Fig. 7 is a top view of the same.

A, A′, and A″ are respectively parts of the box which contains the springs, and to which the parts B and G of the tick or casing which contains the stuffing H are attached. The springs E are supported upon the slats F, which run crosswise of the box and are permanently attached to it. The box being properly constructed and put together, and the springs secured in place, I first cover them with the lower part, G, of the tick or case for containing the hair or other stuffing, which part G, I secure to the edges of the boards that form the sides or ends of the box by nailing or in any suitable manner. The upper ends of the springs E may be secured in place by cords or by attaching them to the part G of the tick. I then put on the stuffing H and the part B, which forms the top, sides, and ends of the tick or casing for the stuffing, attaching it to the sides and ends of the box all around with tacks or in any suitable manner, and gathering it at the folding-points, as shown at D in Figs. 1 and 4, to prevent its being strained or torn in folding. It is important that the box should be constructed with a portion connected to the hinges between the joints, or else the hinges should be made double-jointed, with perforations at short intervals along the middle portion thereof to facilitate the attachment of the ticking thereto. I prefer, however, attaching a section or portion of the side of the box to the hinges between the joints and attaching the ticking thereto in the same manner that it is attached to the other parts, and in that case I prefer to make the hinges, as shown Figs. 6 and 7, with wings or flanges at right angles to each other and perforated for screws, so that they can rest upon and be attached to both the edge and side of the board which forms the side of the box. By attaching the hinges in this manner they are better secured to the box, and rendered less liable to work loose. It is also advantageous to extend the portions of the sides of the box which are attached to the hinges for the purpose of attaching the ticking thereto between the joints, as above described, down to the bottom of the other portions of the box, as shown at A″, and to attach to them one or more slats to support a row of springs. This construction gives a stronger bed, and by placing a row of the springs upon these slats the bed is better supported and the stuffing better kept in place, both when in use and when folded.

To strengthen the box at the points where it is cut and folded and prevent its being forced inward at those points by the very great strain to which it is subjected, I secure at those points in the angle between the side of the box and the slats or bars which support the springs either triangular braces or blocks P, or rectangular braces or blocks Q, which I attach securely both to the sides of the box and to the slats. Either form may be used according to circumstances, or both of these forms of braces may be used in the same bed.

For the purpose of forming a convenient bolster, I cut and hinge the box near the head, as shown in Fig. 4, the parts being united by a hinge, J, and attach a notched ratchet or brace, N, by means of a hinge, to the slat next to the cut or division upon one side thereof, said brace being of such length and so constructed and attached as to rest upon the continuous slat on the other side of the cut or division when not in use, and so as to fall into position to bear against said slat and support the head of the mattress in elevated positions when the latter is raised, as shown in Fig. 4. I attach to this catch or brace N a cord, O, which I extend upward through the mattress for the purpose of lifting the catch N conveniently when the lowering of the head portion or bolster is desired, thus obviating the necessity of reaching under the mattress to operate the catch.

Having thus fully described my invention, I claim as new—

1. The combination of the two parts A and A′ and an intervening portion of the sides of the box of a box spring mattress having the cases containing the stuffing attached to the said sides, the said parts A A′ and the intervening portion being connected to each other by hinges, the joints of which are located twice the distance apart of the thickness of the stuffing, substantially as hereinbefore set forth.

2. The combination of the two parts A A′, hinged at two points the distance apart of twice the thickness of the stuffing, the intervening part A″, and a series of springs supported upon slats attached to the said intervening portion A″, the whole being constructed and operating substantially as hereinbefore set forth.

3. The combination of the parts of the box containing the springs and connected by hinges at two points the distance apart of twice the thickness of the stuffing with the case for the stuffing gathered at the hinges or joints, as set forth.

4. Providing the hinge C with perforations for attaching the ticking, substantially as set forth.

5. The combination, with the box containing the springs, of braces or strengthening-pieces P or Q at the point or points where it is cut or hinged, substantially as and to the effect set forth.

6. The combination of the parts of a box spring-mattress and a hinge constructed and attached to both the edge and side of the boards which form the side of the box, in the manner hereinbefore described.

7. The combination and arrangement of the catch N with the adjacent slats F and F of the box of the mattress, substantially as and for the purpose set forth.

SAMUEL P. KITTLE.

Witnesses:
THOMAS P. HOW,
JAMES T. GRAHAM.